United States Patent [19]
Chang et al.

[11] Patent Number: 6,128,047
[45] Date of Patent: Oct. 3, 2000

[54] MOTION ESTIMATION PROCESS AND SYSTEM USING SPARSE SEARCH BLOCK-MATCHING AND INTEGRAL PROJECTION

[75] Inventors: Ching-Fang Chang, San Jose, Calif.; Naofumi Yanagihara, Tokyo, Japan

[73] Assignees: Sony Corporation, Tokyo, Japan; Sony Electronics, Inc., Park Ridge, N.J.

[21] Appl. No.: 09/081,279

[22] Filed: May 20, 1998

[51] Int. Cl.[7] .............................. H04N 5/14; H04N 9/64
[52] U.S. Cl. ......................... 348/699; 348/407; 348/413; 348/416
[58] Field of Search .................................. 348/699, 700, 348/407, 412, 413, 416; H04N 5/14, 9/64

[56] References Cited

U.S. PATENT DOCUMENTS

| | | | |
|---|---|---|---|
| 5,576,772 | 11/1996 | Kondo | 348/699 |
| 5,652,625 | 7/1997 | Chen et al. | 348/416 |
| 5,654,761 | 8/1997 | Jung | 348/699 |
| 5,699,129 | 12/1997 | Tayama | 348/699 |
| 5,710,603 | 1/1998 | Lee | 348/699 |
| 5,715,017 | 2/1998 | Naito et al. | 348/699 |
| 5,719,642 | 2/1998 | Lee | 348/699 |
| 5,721,595 | 2/1998 | Chen et al. | 348/699 |

OTHER PUBLICATIONS

Dufaux, Frédéric et al., "Motion Estimation Techniques for Digital TV: A Review and a New Contribution," Proceedings of the IEEE, vol. 83, No. 6, Jun. 1995, pp. 858–875.

Jain, Jaswant R. et al., "Displacement Measurement and Its Application in Interframe Image Coding," IEEE Transactions on Communications, vol. Com–29, No. 12, Dec. 1981, pp. 1799–1808.

Jong, Her–Ming et al., "Parallel Architecture for 3–Step Hierarchical Search Block–Matching Algorithm, " IEEE Transactions on Circuits and Systems for Video Technology, vol. 4, No. 4, Aug. 1994, pp. 407–416.

Lee, In–Hong et al., "A Fast Block Matching Algorithm Using Integral Projections," Proceedings Tencon '87 Conference, 1987 IEEE Region 10 Conference, vol. 2 of 3, 1987, pp. 590–594.

Mitchell, Joan L. et al., "MPEG Video Compression Standard," International Thomson Publishing, 1997, pp. 284–286, 301–311.

Ogura Eiji et al., "A Cost Effective Motion Estimation Processor LS I Using A Simple and Efficient Algorithm," IEEE Transactions on Consumer Electronics, vol. 41, No. 3, Aug. 1995, pp. 690–698.

The David Sarnoff Research Center, "MPEG–2: Gains in Picture Quality Lower Cost," 1995, 5 pages.

(List continued on next page.)

*Primary Examiner*—Vu Le
*Assistant Examiner*—Nhon T Diep
*Attorney, Agent, or Firm*—Finnegan, Henderson, Farabow, Garrett & Dunner L.L.P.

[57] ABSTRACT

Methods and systems for obtaining a motion vector between two frames of video image data are disclosed. Specifically, methods and systems of the present invention may be used to perform a block-matching algorithm over a two-dimensional search area in a manner that reduces number of comparisons. In particular, the method determines a best candidate block for each strip based by searching in a first dimension of a two-dimensional search area and based on a predetermined difference criterion. The method then determines a second set of best candidate blocks by performing a limited search in the other direction based on the results from the search in the first dimension. The method then determines a motion vector for the best candidate block. Integral projection arrays may be used to further optimize the search. The methods and systems of the present invention may be used in optimizing digital video encoders, decoders, and format converters.

25 Claims, 12 Drawing Sheets

OTHER PUBLICATIONS

Seferidis, Vassills et al., "General Approach to Block–Matching Motion Estimation," Optical Engineering, vol. 32, No. 7, Jul. 1993, pp. 1464–1473.

Srinivasan, R. et al., "Predictive Coding Based on Efficient Motion Estimation," IEEE Science, Systems & Services for Communications, 1984, pp. 521–526.

Wang, Bor–Min et al., "Zero Waiting–Cycle Hierarchical Block Matching Algorithm and its Array Architectures," IEEE Transactions on Circuits and Systems for Video Technology, vol. 4, No. 1, Feb. 1994, pp. 18–28.

Wuertele, David, "The Inverted Half–Pel Resolution Block Search," The 1993 Symposium on Image Coding (PCSJ93), pp. 55–56.

Vertical Integral Projection

Horizontal Integral Projection

MOTION ESTIMATION PROCESS AND SYSTEM USING SPARSE SEARCH BLOCK-MATCHING AND INTEGRAL PROJECTION

BACKGROUND OF THE INVENTION

The present invention relates generally to methods and apparatus for motion estimation for video image processing, and in particular, is directed to improved methods and apparatus for determining motion vectors between frames of video images using a sparse search block-matching motion estimation technique and integral projection data.

Advancements in digital technology have produced a number of digital video applications. Digital video is currently used in digital and high definition TV, videoconferencing, computer imaging, and high-quality video tape recorders. Uncompressed digital video signals constitute a huge amount of data and therefore require a large amount of bandwidth and memory to store and transmit. Many digital video systems, therefore, reduce the amount of digital video data by employing data compression techniques that are optimized for particular applications. Digital compression devices are commonly referred to as "encoders"; devices that perform decompression are referred to as "decoders". Devices that perform both encoding and decoding are referred to as "codecs".

In the interest of standardizing methods for motion picture video compression, the Motion Picture Experts Group (MPEG) issued a number of standards for digital video processing. MPEG-1 addresses digital audio and video coding and is commonly used by video devices needing intermediate data rates. MPEG-2 is used with devices using higher data rates, such as direct broadcast satellite systems.

Motion picture video sequences consist of a series of still pictures or "frames" that are sequentially displayed to provide the illusion of continuous motion. Each frame may be described as a two-dimensional array of picture elements, or "pixels". Each pixel describes a particular point in the picture in terms of brightness and hue. Pixel information can be represented in digital form, or encoded, and transmitted digitally.

One way to compress video data is to take advantage of the redundancy between neighboring frames of a video sequence. Since neighboring frames tend to contain similar information, describing the difference between frames typically requires less data than describing the new frame. If there is no motion between frames, for example, coding the difference (zero) requires less data than recoding the entire frame.

Motion estimation is the process of estimating the displacement between neighboring frames. Displacement is described as the motion vectors that give the best match between a specified region in the current frame and the corresponding displaced region in a previous or subsequent reference frame. The difference between the specified region in the current frame and the corresponding displaced region in the reference frame is referred to as "residue".

In general, there are two known types of motion estimation methods used to estimate the motion vectors: pixel-recursive algorithms and block-matching algorithms. Pixel-recursive techniques predict the displacement of each pixel iteratively from corresponding pixels in neighboring frames. Block-matching algorithms, on the other hand, estimate the displacement between frames on a block-by-block basis and choose vectors that minimize the difference.

In conventional block-matching processes, the current image to be encoded is divided into equal-sized blocks of pixel information. In MPEG video compression standards, the pixels are grouped into "macroblocks" consisting of a 16×16 sample array of luminance samples together with one 8×8 block of samples for each of the two chrominance components. The 16×16 array of luminance samples further comprises four 8×8 blocks that are typically used as input blocks to the compression models.

FIG. 1 illustrates one iteration of a conventional block-matching process. Current frame 120 is shown divided into blocks. Each block can be any size, however, in an MPEG device, for example, current frame 120 would typically be divided into 16×16-sized macroblocks. To code current frame 120, each block in current frame 120 is coded in terms of its difference from a block in a previous frame 110 or upcoming frame 130. In each iteration of a block-matching process, current block 100 is compared with similar-sized "candidate" blocks within search range 115 of preceding frame 110 or search range 135 of upcoming frame 130. The candidate block of the preceding or upcoming frame that is determined to have the smallest difference with respect to current block 100 is selected as the reference block, shown in FIG. 1 as reference block 150. The motion vectors and residues between reference block 150 and current block 100 are computed and coded. Current frame 120 can be restored during decompression using the coding for each block of reference frame 110 as well as motion vectors and residues for each block of current frame 120.

Difference between blocks may be calculated using any one of several known criterion, however, most methods generally minimize error or maximize correlation. Because most correlation techniques are computationally intensive, error-calculating methods are more commonly used. Examples of error-calculating measures include mean square error (MSE), mean absolute distortion (MAD), and sum of absolute distortions (SAD). These criteria are described in Joan L. Mitchell et al., *MPEG Video Compression Standard*, International Thomson Publishing (1997), pp. 284–86. SAD is a commonly used matching criterion.

SAD is defined as:

$$SAD(i, j) = \sum_{x=0}^{M-1} \sum_{y=0}^{N-1} |r(x, y) - s(x + i, y + j)|$$

where block size is M×N, r(x,y) is the current block and s(x+i,y+j) is the candidate block within a search area 115 in the reference frame. The motion vector is the value (i,j) that results in the minimum value for SAD(i,j).

A block-matching algorithm that compares the current block to every candidate block within the search range is called a "full search". In general, larger search areas generally produce a more accurate displacement vector, however, the computational complexity of a full search is proportional to the size of the search range and is too slow for some applications. A full search block-matching algorithm applied on a macroblock of size 16×16 pixels over a search range of ±N pixels with one pixel accuracy, for example, requires $(2 \times N+1)^2$ block comparisons. For N=16, 1089 16×16 block comparisons are required. Because each block comparison requires 16×16, or 256, calculations, this method is computationally intensive and operationally very slow. Techniques that simply reduce the size of the search area, however, run a greater risk of failing to find the optimal matching block.

As a result, there has been much emphasis on producing fast algorithms for finding the matching block within a wide search range. Several of these techniques are described in Mitchell et al., pp. 301–11. Most fast search techniques gain speed by computing the displacement only for a sparse sampling of the full search area. The 2-D logarithmic search, for example, reduces the number of computations by computing the MSE for successive blocks moving in the direction of minimum distortion. In a conjugate direction search, the algorithm searches in a horizontal direction until a minimum distortion is found. Then, proceeding from that point, the algorithm searches in a vertical direction until a minimum is found. Both of these methods are faster than a full search but frequently fail to locate the optimal matching block.

Another method for reducing the amount of computation in a full search is to calculate the displacement between blocks using integral projection data rather than directly using spatial domain pixel information. An integral projection of pixel information is a one-dimensional array of sums of image pixel values along a horizontal or vertical direction. Using two 1-D horizontal and vertical projection arrays rather than the 2-dimensional array of pixel information in a block-matching algorithm significantly reduces the number of computations of each block-matching. This technique is described in a paper by I. H. Lee and R. H. Park entitled "A Fast Block Matching Algorithm Using Integral Projections," Proc. Tencon '87 Conf., 1987, pp. 590–594.

Fast motion estimation techniques are particularly useful when converting from one digital video format to another. Digital video is stored in encoded, compressed form. When converting from one format to another using conventional devices, the digital video must first be decompressed and decoded to its original pixel form and then subsequently encoded and compressed for storage or transmission in the new format. Conversion techniques requiring that digital video be fully decoded are very time-consuming.

The present invention provides improved methods and apparatus for the motion estimation process by performing a fast search that minimizes the number of block comparisons while maintaining the quality of the motion vector. In addition, the present invention provides methods and apparatus for motion estimation using the fast search process of the present invention and integral projection to further minimize the number of computational operations. The present invention further provides methods and apparatus for fast motion estimation using integral projection that allow digital video data conversion from one format to a second format without full decoding to pixel data thereby greatly reducing the time required for data format conversion.

SUMMARY OF THE INVENTION

Methods for obtaining a motion vector between two frames of video image data consistent with this invention comprise the steps of: (a) selecting a two-dimensional current block of a first frame, the current block comprising an N×M array of pixel information, where N and M are positive integers greater than 1; (b) determining a two-dimensional search area of a second frame based on the current block and a predetermined search range; (c) determining a first set of candidate blocks by selecting at least one candidate block in each strip of pixel information based on the current block and a predetermined difference criterion, each candidate block comprising an N×M array of pixel information; (d) determining a second set of candidate blocks by selecting at least one candidate block in each of at least one secondary search areas based on the current block and the predetermined difference criterion, each candidate block comprising an N×M array of pixel information and each of the at least one secondary search areas based on the first set of candidate blocks; (e) obtaining a reference block from the second set of candidate blocks based on the predetermined difference criterion; and (f) determining a motion vector representing the distance between the current block and the reference block.

A motion estimation system for obtaining a motion vector between two frames of video image data comprises means for selecting a two-dimensional current block of a first frame, the current block comprising an N×M array of pixel information, where N and M are positive integers greater than 1; means for determining a two-dimensional search area of a second frame based on the current block and a predetermined search range; means for determining a first set of candidate blocks by selecting at least one candidate block in each strip of pixel information based on the current block and a predetermined difference criterion, each candidate block comprising an N×M array of pixel information; means for determining a second set of candidate blocks by selecting a candidate block in each of at least one secondary search areas based on the current block and the predetermined difference criterion, each candidate block comprising an N×M array of pixel information and the at least one secondary search areas based on the first set of candidate blocks; means for obtaining a reference block from the second set of candidate blocks based on the predetermined difference criterion; and means for determining a motion vector representing the distance between the current block and the reference block.

A computer program product consistent with the present invention comprises a computer-usable medium having computer-readable code embodied therein for obtaining a motion vector between two frames of video image data, the computer-usable medium comprising a component configured to select a two-dimensional current block of a first frame, the current block comprising an N×M array of pixel information, where N and M are positive integers greater than 1; a component configured to determine a two-dimensional search area of a second frame based on the current block and a predetermined search range; a component configured to determine a first set of candidate blocks by selecting at least one candidate block in each strip of pixel information based on the current block and a predetermined difference criterion, each candidate block comprising an N×M array of pixel information; a component configured to determine a second set of candidate blocks by selecting at least one candidate block in each of at least one secondary search areas based on the current block and the predetermined difference criterion, each candidate block comprising an N×M array of pixel information and each of the at least one secondary search areas based on the first set of candidate blocks; a component configured to obtain a reference block from the second set of candidate blocks based on the predetermined difference criterion; and a component configured to determine a motion vector representing the distance between the current block and the reference block.

According to another aspect of the invention, a method for converting a frame of digital video data from a first format to a second format, comprising the steps of obtaining digital coefficient information representing pixel information of a first frame in a first format; and determining a motion vector representing the difference between a first frame in a second format and a second frame in the second format based on the digital coefficient information, wherein the first frame in the second format corresponds to the first frame in the first format.

Furthermore, a system for converting a frame of digital video data from a first format to a second format comprises means for obtaining digital coefficient information representing pixel information of a first frame in a first format; and means for determining a motion vector representing the difference between a first frame in a second format and a second frame in the second format based on the digital coefficient information, wherein the first frame in the second format corresponds to the first frame in the first format.

BRIEF DESCRIPTION OF THE DRAWINGS

The accompanying drawings, which are incorporated in and constitute a part of this specification, illustrate the invention and, together with the description, serve to explain the principles of the invention.

DESCRIPTION OF THE PREFERRED EMBODIMENTS

Reference will now be made in detail to preferred implementations consistent with the present invention, an example of which is illustrated in the accompanying drawings.

A. Sparse Search Process

Generally, motion estimation techniques take advantage of redundancy between successive frames of a video sequence. Often, the neighboring frames contain very similar information although slightly displaced. Motion estimation techniques compress the amount of data needed to represent a digital video sequence by encoding one frame in terms of its difference from a neighboring frame rather than encoding each frame in its entirety. When the video sequence is replayed, the decoder reconstructs the current frame using the reference frame as well as the motion vectors and the residues.

Figure 1:
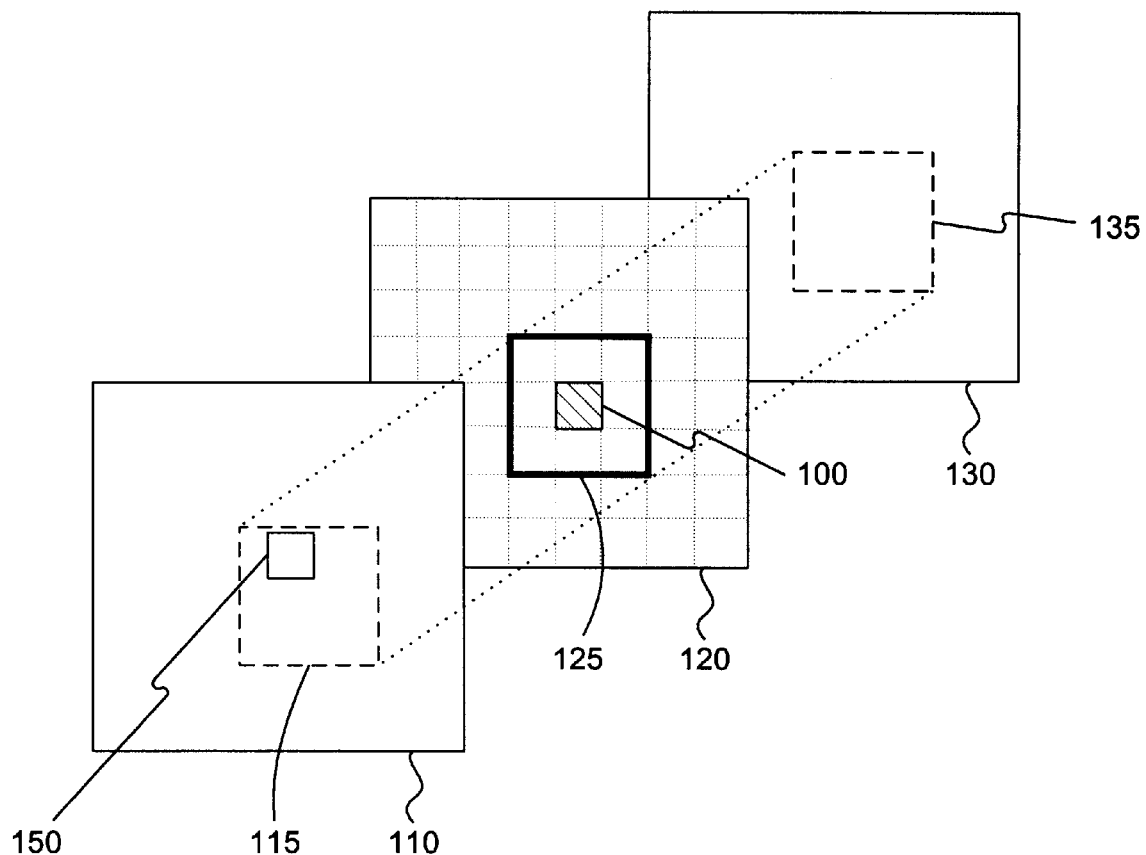
FIG. 1 is a diagram illustrating a prior art block-matching technique.
Figure 2:
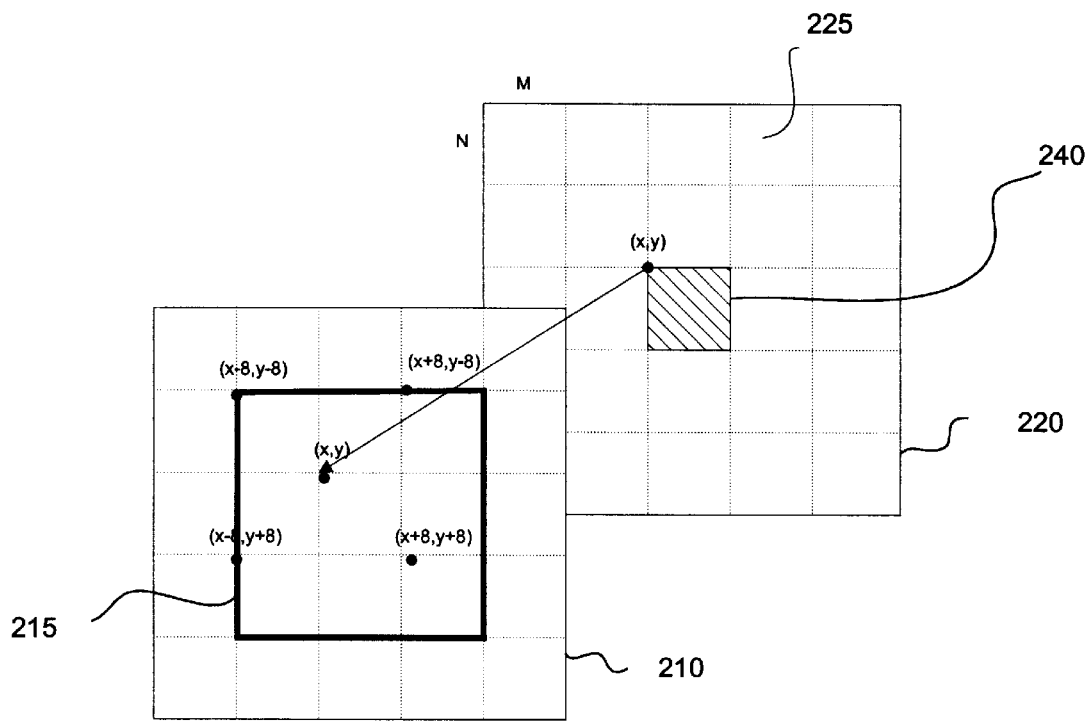
FIG. 2 is a diagram illustrating a step of selecting a search area for a block-matching search consistent with the present invention.

In a method consistent with the present invention, a motion vector is estimated for each block of a current frame with respect to a reference frame. FIG. 2 shows current frame 220 and reference frame 210. Current frame 220 is divided into a plurality of blocks 225, each comprising M×N pixels. M and N may represent any integer values greater than one, however, in the following example, M=N=8. To represent current frame 220, each block 225 in current frame 220 is represented as a motion vector indicating displacement from a similar size block in reference frame 210 and is represented as residues between the block in the current frame and the block in the reference frame.

Figure 3A:
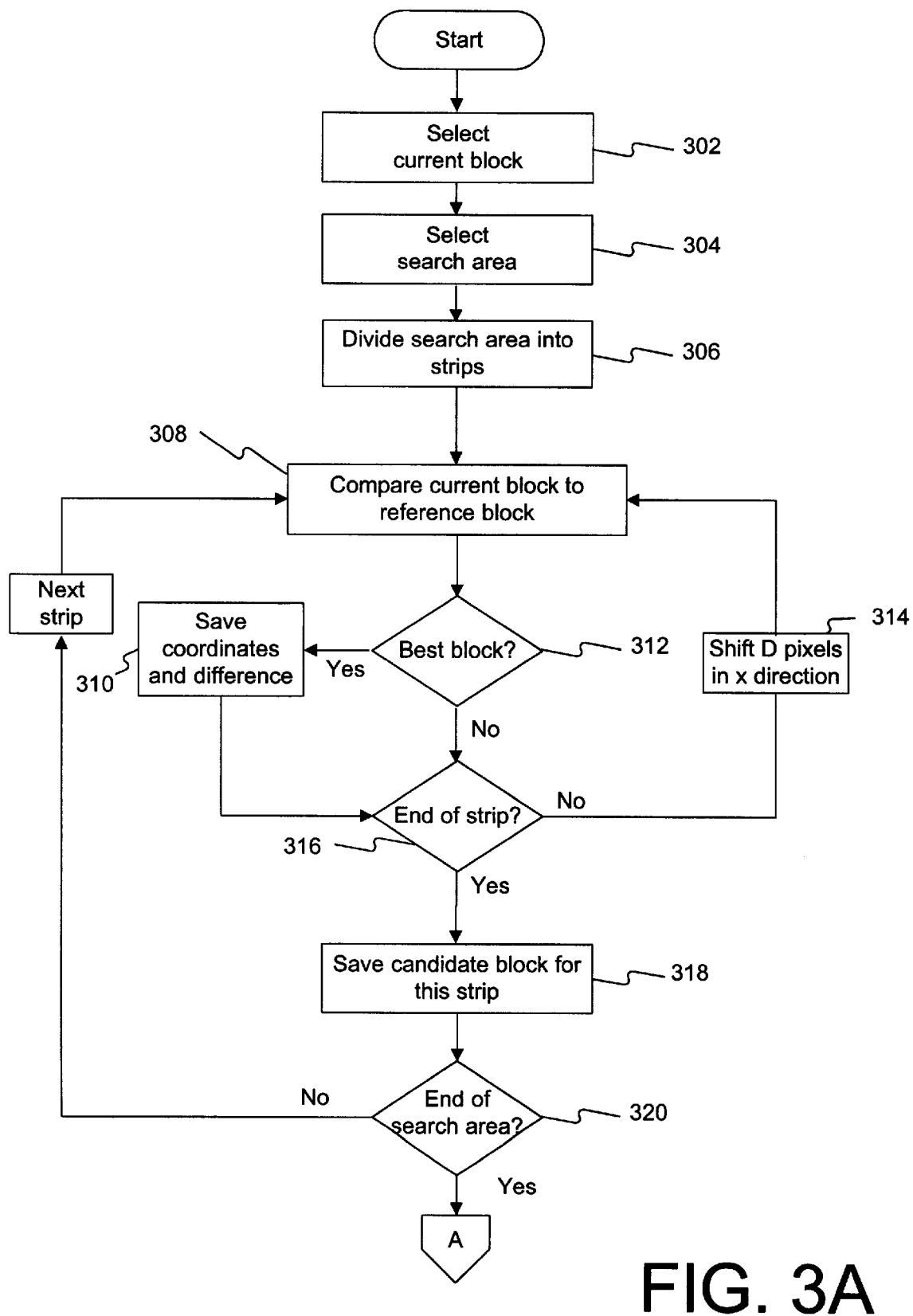
FIGS. 3A and 3B are a flow diagram illustrating a method for performing a block-matching search consistent with the present invention.
Figure 3B:
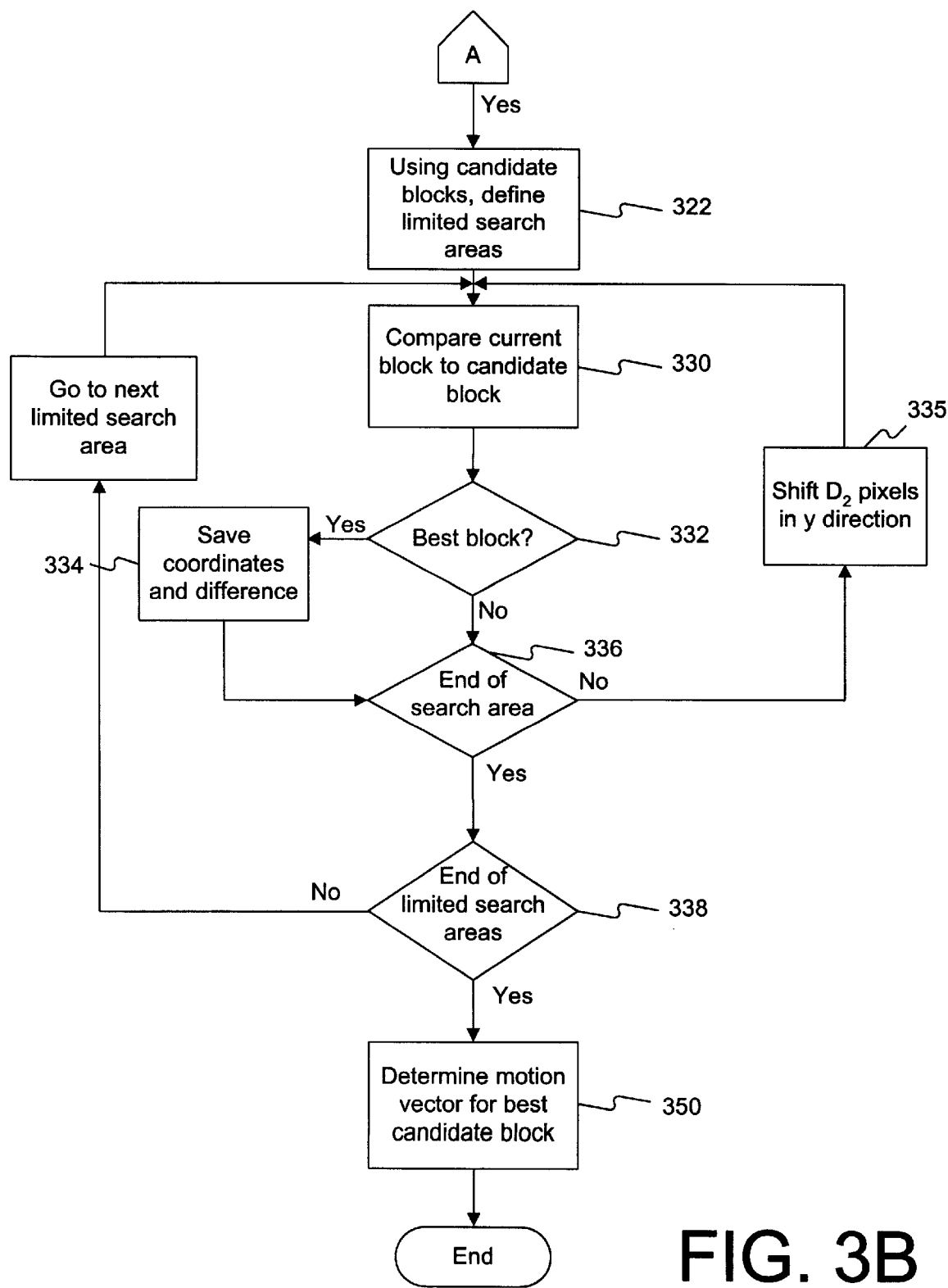

FIGS. 3A and 3B contain a flow chart illustrating a method consistent with the present invention for obtaining a motion vector for one block of a current frame. In particular, FIGS. 3A and 3B describe the method of estimating a motion vector for one block. To begin, the process selects current block 240 of current frame 220 as shown in FIG. 2 (Step 302). To determine a motion vector using a block-matching algorithm, current block 240 is compared with some or all of the candidate blocks in a corresponding search area of reference frame 210.

Referring again to FIG. 3A, the next step is to select a search area 215 of reference frame 210 (Step 304). Search area 215 of FIG. 2 is defined by a search range, ±S, and is based on the location of current block 240 in current frame 220. Search range S may be predetermined or may be determined dynamically. Search range S may be the same for all frames or may depend on the time difference between the current frame and the reference frame. Search range S can be any positive integer value greater than zero, but less than the frame size. Although larger search sizes generally produce a more accurate motion vector, a search range S less than the full frame size is recommended because the operational complexity of the search may grow in proportion to the search area. For the purposes of illustration only, the following example assumes the search range is defined as 8 pixels, or S=8. FIG. 2 shows search area 215 defined by S 8; the point marked (x, y) refers to the upper left pixel of current block 240. Assuming the search range equals ±8, the search area for point (x, y) is the area bounded by (x−8, y−8), (x+8, y−8), (x+8, y+8), and (x−8, y+8) determined by the area S pixels from starting point (x, y) in reference frame 210. The search range in the x and y directions can be different, however, for ease of explanation the example herein assumes the search range is the same in both x and y directions.

In a conventional one-pixel-step full search, current block 240 would be compared with each possible 8×8 candidate block in the search area. For example, current block 240 would first be compared with the 8×8 block in the upper leftmost corner of search area 215 and the difference would be calculated. After the first comparison was computed, current block 240 would be compared with the 8×8 block beginning one pixel to the right, and the difference would be calculated. Following the comparison of current block 240 with the candidate block beginning at (x+8, y−8), the process would continue on the next "row", comparing current block 240 with the candidate block with upper left corner (x−8, y−7). Using sum of absolute distortions (SAD) as the matching criteria, for example, the full search process may be defined as follows:

$$SAD(i, j) = \sum_{x=0}^{7} \sum_{y=0}^{7} |r(x, y) - s(x + i, y + j)|$$

for −8<=i<=8 and −8<=j<=+8, where r is the current block and s is the candidate block. The (i,j) pair that produces a minimum value for SAD (i,j) defines the motion vector of current block 240. A motion vector of (1,1), for example, means that a block in the reference frame one pixel horizontally to the right and one pixel vertically below the corresponding location of current block 240 in the reference frame closely resembles current block 240. The array of values, r(x, y)−s(x+I, y+j) for x=0, 1, . . . , 7 and y=0, 1, . . . 7 are recorded as the residue for that current block and candidate block.

The present invention reduces the number of block comparisons by selectively choosing to calculate only a subset of the comparisons calculated by the full search. Thus, the process performs a search in one of the horizontal or vertical directions. Then, the process performs a limited search in the other direction based on the results of the search in the first direction. The order of directions in which the first two searches are performed is immaterial, that is, the search may be performed first in the vertical direction then in the horizontal direction or vice versa. For the purpose of illustration only, the following example assumes that the process begins with a horizontal search in the x direction.

Figure 4:
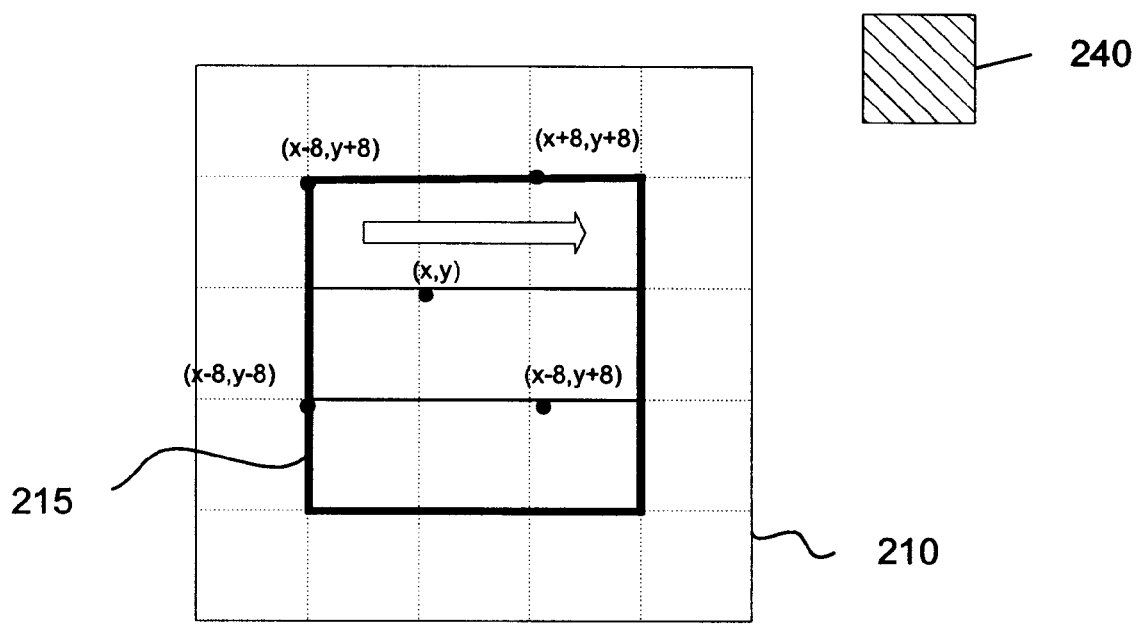
FIG. 4 is a diagram illustrating a step of performing an x-directional search of a block-matching search consistent with the present invention.

Consistent with the present invention, search area 215 is divided into a plurality of subsets of rows (Step 306 of FIG. 3A) as shown in FIG. 4. Each subset, or "strip", is Z rows of pixels wide. Z can be any integer greater than one and less than or equal to S, the search range. Preferably, however, Z is an integer factor of S. In the embodiment depicted in FIG. 4, Z=8. Search area 215 is therefore partitioned into (S/Z)× 2+1 (8/8)×2+1=3 strips.

The process performs the x-directional search by comparing current block 240 to a subset of candidate blocks in each strip. In each comparison, the y-coordinate of the candidate block will be an integer multiple of Z, or in this case, 8. The process calculates the difference from current block 240 and each candidate block using any suitable error calculating or correlation method (Step 308).

If the difference for a candidate block is less than the difference calculated so far for other candidate blocks in this strip or if this is the first candidate in the strip, then this candidate is the "best" candidate block (Step 312). The coordinates and difference of the best candidate block are saved for future comparisons (Step 310). If the difference for this candidate block is greater than previous difference calculations, the candidate block coordinates are discarded.

If the candidate block is not the last block in the strip (Step 316), the process shifts D pixels in the x direction (step 314). Current block 240 is compared to the candidate block in the new position (Step 308) and the process continues from step 308. D can be any integer value ranging from 1 to S. If D=1, for example, current block 240 is compared to every candidate block in the strip.

At the end of a strip (Step 316), the process saves the candidate block for that strip by, for example, recording the x and y coordinates that correspond to the upper left corner of the candidate block that resulted in the least difference from current block 240 (Step 318). The process is repeated for each strip in search area 215. At the conclusion of the x-directional search step (320), the process has recorded one "best" candidate block for each strip. The term "best" refers to the candidate block that results in the least difference from current block 240.

Figure 5:
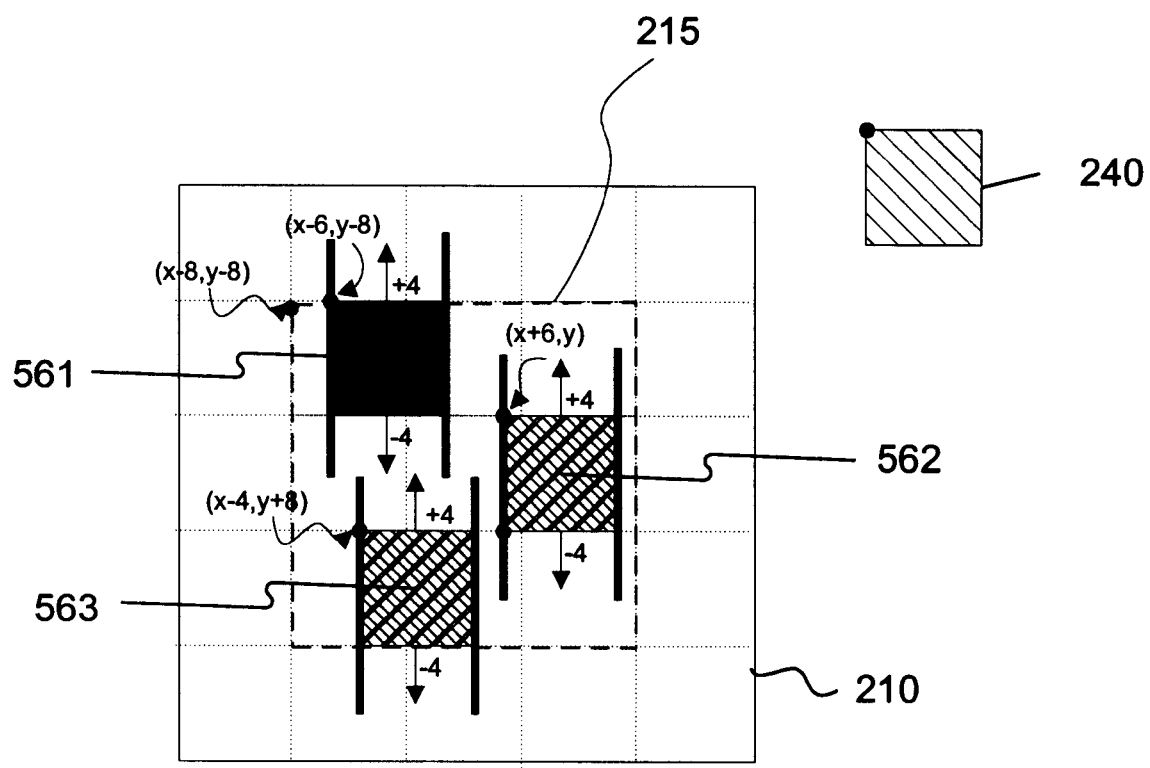
FIG. 5 is a diagram illustrating the step of performing a y-directional search of a block-matching search consistent with the present invention.

Next, the process searches in the other orthogonal direction which, in this case, is the y-direction. For the best candidate block of each strip, the process defines limited search areas (Step 322, FIG. 3B). FIG. 5 shows search area 215 and best candidate blocks, 561, 562, and 563. Each limited search area comprises the partial column formed by the candidate block and including some number of additional rows in each direction. In other words, each limited search area in the second step is the area formed by sliding the best candidate blocks obtained in step one some number of rows in either direction. The number of rows in each direction may be different, however, for the sake of explanation, each limited search area includes Y rows in each direction. Y may be any integer value greater than one, however, if Y≧Z, the process will unnecessarily duplicate some difference calculations performed in the x-direction. For the purposes of example only, assume Y=Z/2, which in this example means Y=4.

Referring again to FIG. 3B, current block 240 is compared to a first candidate block (Step 330). To make the comparison, the left edge of current block 240 is aligned with the left edge of the candidate column. The process calculates the difference from current block 240 and the candidate block using any suitable error calculating or correlation method.

If this is the first difference calculated or the difference for this candidate block is less than the difference calculated so far for other candidate blocks, the coordinates and the difference of the candidate block are saved for future comparisons (Step 334). If the difference for this candidate block is greater than previous difference calculations, the candidate block coordinates are discarded and the process continues with step 336.

If the candidate block is not the last block in the limited search area (step 336), the process shifts $D_2$ pixels in the y direction (step 335). Current block 240 is compared to the candidate block in the new position (Step 330). The process continues from step 330. $D_2$ can be any integer value ranging from 1 to Y.

Referring again to FIG. 3B, if the process reaches the end of a limited search area (Step 338), the process goes to the next limited search area and continues from step 330. At the end of the limited search areas, the process determines the motion vector using the coordinates of the "best" candidate block over all the limited search areas (Step 350). The array of pixel differences is recorded as the residue for the current block and the "best" candidate block.

B. Sparse Search using integral projection data

Figure 6A:
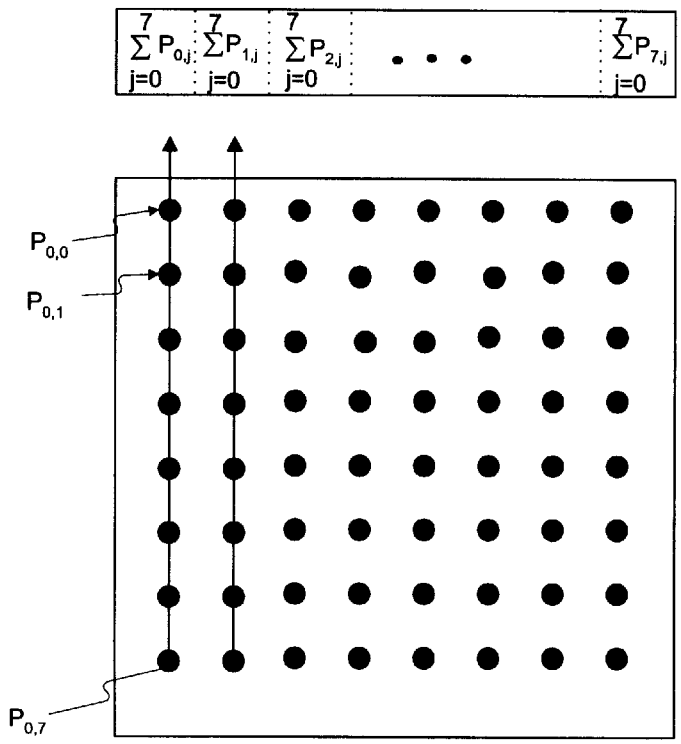
FIG. 6A is a diagram showing a method of calculating a vertical integral projection for an 8×8 array of pixel information.
Figure 6B:
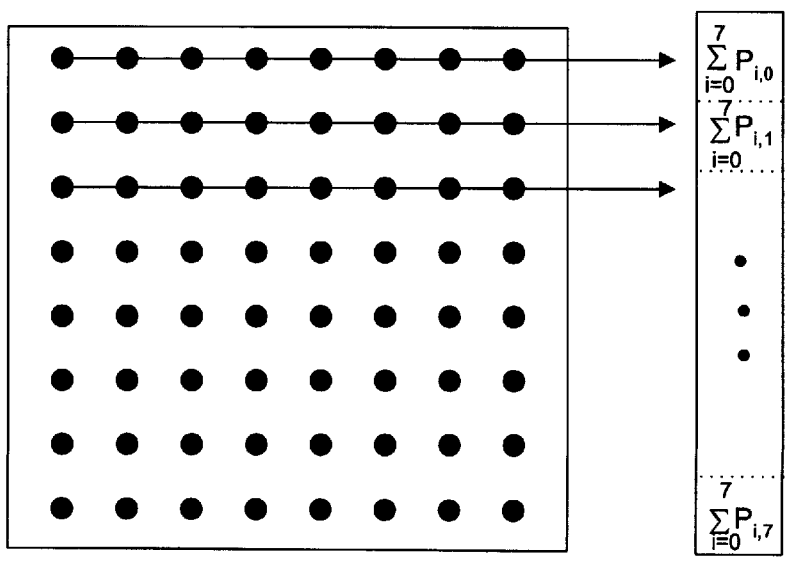
FIG. 6B is a diagram showing a method of calculating a horizontal integral projection for an 8×8 array of pixel information.

Conventional motion estimation techniques such as block-matching algorithms use spatial domain pixel information for estimating the motion vectors. When comparing an N×N current block to an N×N candidate block using pixel information and a difference calculation such as SAD described above, N×N calculations are required. It is possible, however, to compare the two blocks using other information, such as integral projections. An integral projection of pixel information is a sum of some number of image pixel values along a certain horizontal or vertical direction. FIG. 6A shows a vertical integral projection; FIG. 6B shows a horizontal integral projection.

An alternate embodiment of the present invention uses integral projection information in conjunction with the sparse search described above to further reduce the number of computations performed in determining motion vectors. Integral projection information can be obtained by calculating one-dimensional integral projection arrays from pixel information or by calculating integral projection information from discrete cosine transform (DCT) coefficient data from, for example, a digital video decoder. In particular, the present invention may be used to reduce the computations necessary, and therefore decrease the computation time needed, to convert from one digital video format to another such as, for example, from digital video (DV) format to MPEG format.

The DCT may be described mathematically as follows:

$$Q(h, v) = C(h)C(v) \sum_{y=0}^{7} \sum_{x=0}^{7} P(x, y) \cos\left(\frac{\pi h(2x+1)}{16}\right) \cos\left(\frac{\pi v(2y+1)}{16}\right)$$

for h=0,1, ... 7 and v=0,1, ... 7 and where $$C(h) = \begin{cases} \frac{1}{2\sqrt{2}}, & h = 0 \\ \frac{1}{2}, & h = 1 \text{ to } 7 \end{cases}$$

and $$C(v) = \begin{cases} \frac{1}{2\sqrt{2}}, & v = 0 \\ \frac{1}{2}, & v = 1 \text{ to } 7 \end{cases}$$

P (x,y) is an 8×8 block of pixel data and Q(h,v) is an 8×8 block of DCT coefficients. Mathematically, if an 8×8 block of DCT coefficients is used as input to a one-dimensional horizontal inverse discrete cosine transform (IDCT), the result will be an 8×8 array, the first row of which contains the sums of each column of pixel information multiplied by a constant. The first row therefore equals a one-dimensional vertical projection of that 8×8 block of pixel information. Similarly, if the same 8×8 block of DCT coefficients is input to a one-dimensional vertical IDCT, the first column of the result will be equivalent to a one-dimensional horizontal projection of the underlying 8×8 block of pixel information. The vertical and horizontal integral projections may be used to estimate the motion vectors.

A method consistent with the present invention using integral projections is similar to the embodiment described above. Referring again to FIG. 3A, the method first selects current block 240 of current frame 220 as shown in FIG. 2 (Step 302). Current frame 220 is divided into a plurality of identical size search blocks, each comprising N×M pixels. N and M may represent any integer values greater than one, however, when using integral projection data obtained by performing a one-dimensional IDCT on the DCT coefficient array, it is recommended to choose N and M equal to integer multiples of the size of the blocks used during the DCT phase of encoding. For example, if the video encoder performed DCT compression on 8×8 blocks of pixel information, choosing N=M=8 is recommended.

Referring again to FIG. 3A, the next step is to select a search area 215 of reference frame 210 (Step 304). The search range, S, may be any integer value, however, when integral projections are obtained from 8-point DCT coefficients from the video decoding process, it is preferable to select a search range that is an integer multiple of 8. The following example assumes the search range is defined as 8 pixels, or S=8. Assuming the search range, S, equals ±8, the search area is the area bounded by (x−8, y−8), (x+8, y−8), (x+8, y+8), and (x−8, y+8). Search area 215 is then divided into strips as shown in FIG. 4, each strip comprising some number, Z, of rows. In this embodiment, each "strip" is 8 rows wide so as to be able to take advantage of the integral projection data obtained from DCT coefficients. Search area 215 is therefore partitioned into (S/Z)×2+1=(8/8)×2+1=3 strips.

The process performs the x-directional search by comparing current block 240 to a subset of candidate blocks in each strip, as shown in FIG. 4. In each comparison, the y-coordinate of the candidate block will be an integer multiple of Z, or in this case, 8. The process calculates the difference from current block 240 and each candidate block using any suitable error calculating or correlation method (Step 308).

If the difference for a candidate block is less than the difference calculated so far for other candidate blocks in this strip or this is the first candidate in the strip, then this candidate is the "best" candidate block (Step 312). The coordinates and difference of the best candidate block are saved for future comparisons (Step 310). The process calculates the difference from current block 240 and the candidate block using any suitable error calculating or correlation method (Step 308). In the first embodiment, the calculations were performed on pixel data. In an embodiment of the present invention using integral projection data, the one-dimensional integral projection array is used instead. If the x-directional search is performed using vertical projections, as the candidate block moves from left to right within a strip, most vertical projections for each candidate block can be obtained from the block to the left without recalculation.

If integral projection information is being calculated from pixel data, the process calculates N vertical projections for the N×N candidate block and N vertical projections for the N×N current block 240. The resulting sums may then be used in the difference calculation. For example, using sum of absolute distortions (SAD) as the matching criteria, the vertical projection difference is then calculated as follows:

$$SAD_v(i, j) = \sum_{x=0}^{7} |r(x) - s(x+i, j)|$$

where −S≦i≦+S, −S≦j<+S, and j is an integer multiple of Z. In addition, r(x) is the vertical projection for the xth column of the current block and s(x+i,j) is the vertical projection or sum of the (x+i)th column of the candidate block starting at row j.

Figure 7:
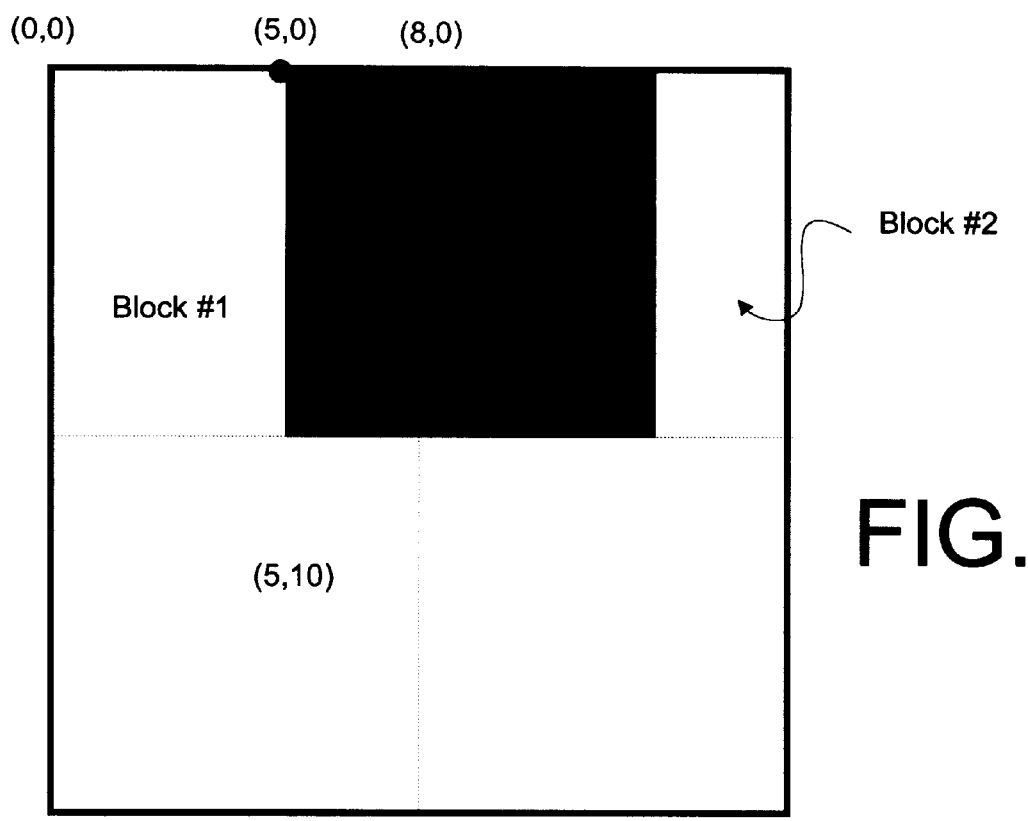
FIG. 7 is a diagram showing a candidate block horizontally straddling two 8×8 blocks consistent with the present invention.

If the vertical projections for the candidate block are obtained from DCT coefficients, vertical projection s(x+i,j) may be computed from two blocks. DCT coefficient arrays are calculated for 8×8 blocks such as Block #1 and Block #2 in FIG. 7. If the coordinates of a candidate block coincide exactly with an 8×8 DCT coefficient array, the vertical projection arrays can be easily obtained by performing a one-dimensional IDCT on row 0 of the 8×8 DCT coefficient array. If a candidate block straddles two 8×8 DCT arrays horizontally as shown in FIG. 7, vertical projection information is obtained by calculating a one-dimensional IDCT for row 0 of the two neighboring 8×8 arrays for which there are DCT coefficients.

Figure 8:
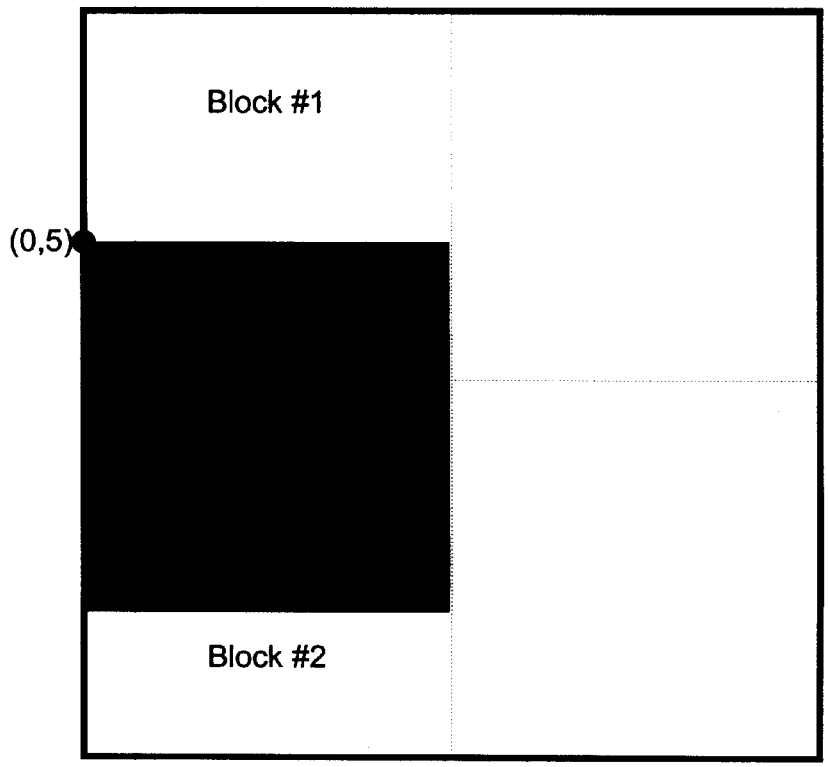
FIG. 8 is a diagram showing a candidate block vertically straddling two 8×8 blocks consistent with the present invention.

If a candidate block straddles two 8×8 DCT arrays vertically as shown in FIG. 8, the total difference in vertical projection is obtained by calculating the weighted sum of the difference values for the two neighboring 8×8 arrays for which there are DCT coefficients. For example, the difference value of candidate block 820 with upper leftmost point equal to (0,5) as shown in FIG. 8 is equal to a weighted sum of the difference between block #1 and current block 240 and the difference between block #2 and current block 240. Candidate block 820 overlaps ⅜ths of block 1 and ⅝ths of block 2, therefore, the SAD for candidate block 820 is as follows:

$$SAD_v(0, 5) = 3/8 \sum_{x=0}^{7} |r(x) - s(x, 0)| + 5/8 \sum_{x=0}^{7} |r(x) - s(x, 8)|$$

where r(x) is the vertical projection for the xth column of the current block, s(x,0) is the vertical projection or sum of the xth column of block #1 and s(x,8) is vertical projection or sum of the xth column of block #2.

Referring again to FIG. 3A, if this is the first difference calculated or the difference for this candidate block is less than the difference calculated so far for other candidate blocks in this strip (step 312), the coordinates and difference of the candidate block are saved for future comparisons (Step 310). If the difference for this candidate block is greater than previous difference calculations, the candidate block is discarded.

If the candidate block is not the last block in the strip (Step 316), the process shifts D pixels in the x direction (step 314). Current block 240 is then compared with the candidate block in the new position (step 308) and the process continues from step 308. D can be any integer value ranging from 1 to S. If D=1, for example, current block 240 is compared to every candidate block in the strip.

At the end of a strip, the process records the x and y coordinates that correspond to the upper left corner of the candidate block that resulted in the least difference from current block 240 (Step 318). The process is repeated for each strip in search area 215. At the conclusion of the x-directional search step, the process has recorded one "best" candidate block for each strip (Step 320). The term "best" refers to the candidate block that results in the least difference from current block 240.

Next, the process searches in the y-direction. FIG. 5 shows search area 215 in reference frame 210 and best candidate blocks 561, 562, and 563 from the x-directional search. For the best candidate block of each strip, the secondary limited search area comprises the column formed by the best candidate block and includes Y rows in each direction. Y may be any integer value greater than one, however, if Y≧S, the process will unnecessarily duplicate some difference calculations performed in the x-direction. For the purposes of example only, assume Y=S/2 or in this case, Y=4.

The process can shift any number of pixels (1 to Y) in the y direction, however, for ease of explanation, we assume the process shifts one pixel in the y direction each time. The compare process may begin, for example, by comparing current block 240 and the candidate block with upper leftmost point equal to (m, n−Y) if the upper leftmost point of best candidate block 561 is (m, n) (Step 330).

The process calculates the difference from current block 240 and the candidate block using any suitable error calculating or correlation method (Step 330). In the first embodiment, the calculations were performed on pixel data. In an embodiment of the present invention using integral projection data, the one-dimensional integral projection array is used instead. Performing the second search process, the y-directional search in this example, using both horizontal and vertical projections may produce more accurate motion estimation. Using horizontal integral projections only, however, reduces the number of operations performed and may be preferable in some applications.

If integral projection information is being calculated from pixel data, the process calculates N horizontal projections for the N×N candidate block and N horizontal projections for the N×N current block 240. The resulting sums may then be used in the difference calculation. For example, using sum of absolute distortion (SAD) as the matching criteria, the horizontal projection difference is then calculated as follows:

$$SAD_H(m, j) = \sum_{y=0}^{7} |t(y) - u(m, j + y)|$$

where n−Y≦j≦n+Y, where t(y) is the horizontal projection for the yth row of the current block and u(m, j+y) is the horizontal projection or sum of the yth row of the candidate block.

The vertical projection difference can be calculated using:

$$SAD_v(m, j) = \sum_{x=0}^{7} |r(x) - s(x + m, j)|$$

where −S≦j≦+S, where r(x) is the vertical projection for the xth column of the current block and s(x+m, j) is the vertical projection of the xth column of the candidate block. The total difference is the sum of the horizontal projection difference and the vertical projection difference.

Figure 9:
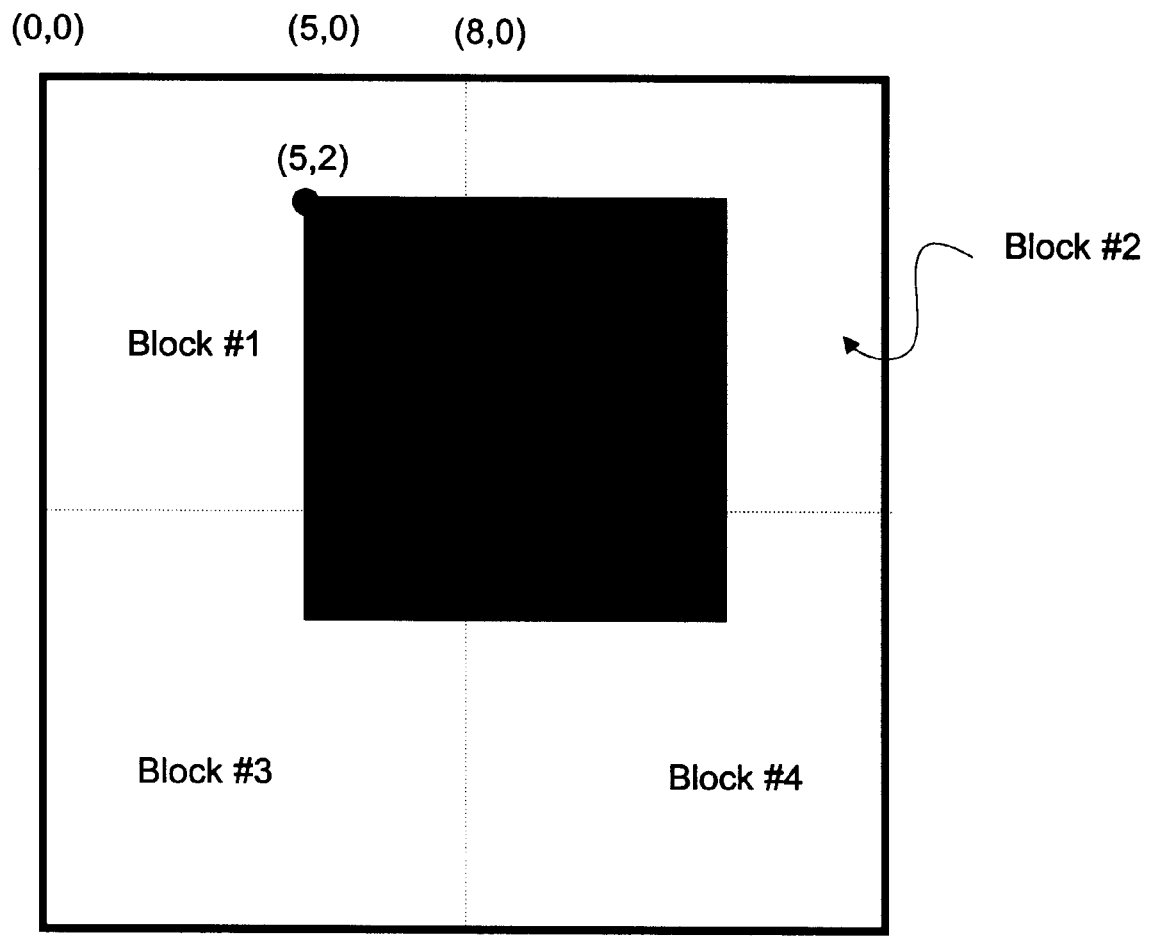
FIG. 9 is a diagram showing one step of a block-matching process consistent with the present invention.

If the projection data for the candidate blocks are obtained from DCT coefficients, the total difference calculation is more complicated. In the x-directional search, if the upper edge of current block 240 is aligned with the upper edge of the candidate row, the y-coordinate will be an integer multiple of Z, or in this case, 8, making easy the calculation of integral projections from DCT coefficients. In the second step of the search, whether vertical or horizontal, the candidate blocks will not be aligned with the 8×8 arrays of DCT coefficients. For example, the total difference of candidate block 910 with upper leftmost point equal to (5,2) as shown in FIG. 9 is equal to a weighted sum of the differences between blocks #1, #2, #3, #4, and current block 240. For example, the weighted sum of the differences of the four neighboring blocks can be calculated as ((8−2)/8)*(the difference from search using vertical projections at (5,0))+(2/8)*(the difference from search using vertical projections at (5,8))+((8−5)/8)*(the difference from search using horizontal projections at (0,2))+(5/8)*(the difference from search using horizontal projections at (8,2)).

Mathematically, the SAD for candidate block 910 is as follows:

$$SAD(5, 2) = \frac{(8-2)}{8} \sum_{x=0}^{7} |r(x) - s(x + 5, 0)| +$$

$$\frac{2}{8} \sum_{x=0}^{7} |r(x) - s(x + 5, 8)| +$$

$$\frac{(8-5)}{8} \sum_{y=0}^{7} |t(y) - u(0, y + 2)| +$$

-continued $$\frac{5}{8}\sum_{y=0}^{7}|t(y) - u(8, y+2)|$$

where r(x) is the vertical projection for the xth column of the current block, t(y) is the horizontal projection for the yth row of the current block, s(x+5,0) and s(x+5,8) are the vertical projections or sums of the (x+5)th column of block #1 and block #3, respectively, for $0 \leq x \leq 2$; s(x+5,0) and s(x+5, 8) are the vertical projections or sums of the (x+5–8)th column of block #2 and block #4, respectively, for $3 \leq x \leq 7$; u(0,y+2) and u(8, y+2) are the horizontal projections or sums of the (y+2)th row of block #1 and block #2, respectively, for $0 \leq y \leq 5$; u(0, y+2) and u(8, y+2) are the horizontal projections or sums of the (y+2–8)th row of block #3 and block #4, respectively, for $6 \leq y \leq 7$.

The process increases the vertical index j with each comparison until it finds the best j that produces the minimum difference between the candidate block and current block 240. This procedure is repeated for each of the mini search areas defined by best candidate blocks, 561, 562, and 563 and a best candidate block is recorded. With each comparison, if the candidate results in the minimum total difference from current block 240, the coordinates and the total difference of the candidate are recorded. When all the mini searches are complete, the recorded best candidate block is the reference block that best resembles current block 240. Finally, the process calculates the motion vector and residue from the best candidate block (m,l) and current block 240.

Figure 10A:
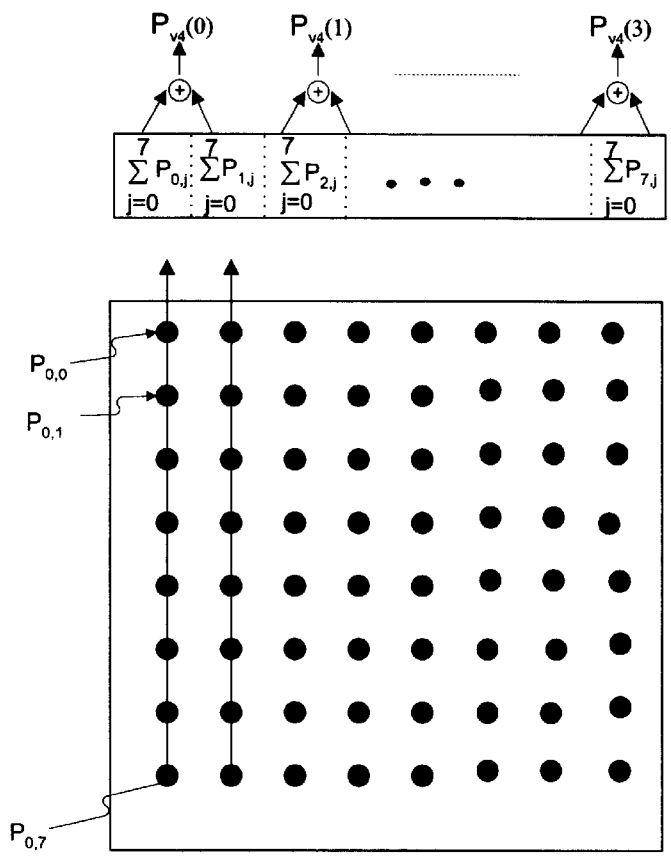
FIG. 10A is a diagram showing a method of calculating vertical integral projections for an 8×8 array of pixel information.
Figure 10B:
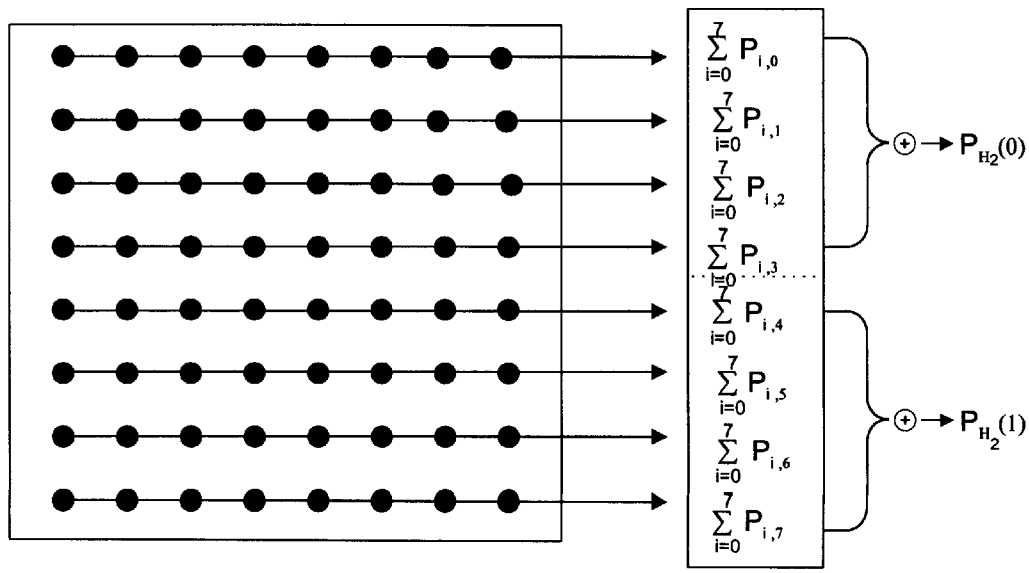
FIG. 10B is a diagram showing a method of calculating horizontal integral projections for an 8×8 array of pixel information.

Calculating integral projections using 1-D IDCTs of frequency domain information requires approximately 11 multiplications and 29 additions for each set of 8 projections. If the projections are calculated purely in the spatial domain, it takes about 56 operations for each set of 8 projections. The performance gain of the frequency domain method will be higher if only the 4-point IDCT of the four lower frequency coefficients is used. This process is equivalent to performing further filtering and decimation on the 8 projections. In this case, only four integral projections in every 8×8 block are used. The four projection data obtained from the 4-point IDCT are equivalent to the sums of every two adjacent integral projections as illustrated in FIG. 10A. It is also possible to use 2 projections in every 8×8 block by using 2-point IDCT on two lower frequency coefficients or performing another step of summation similar to the procedure in FIG. 10B. Using fewer projections can further reduce the number of operations in motion search.

C. System

Figure 11:
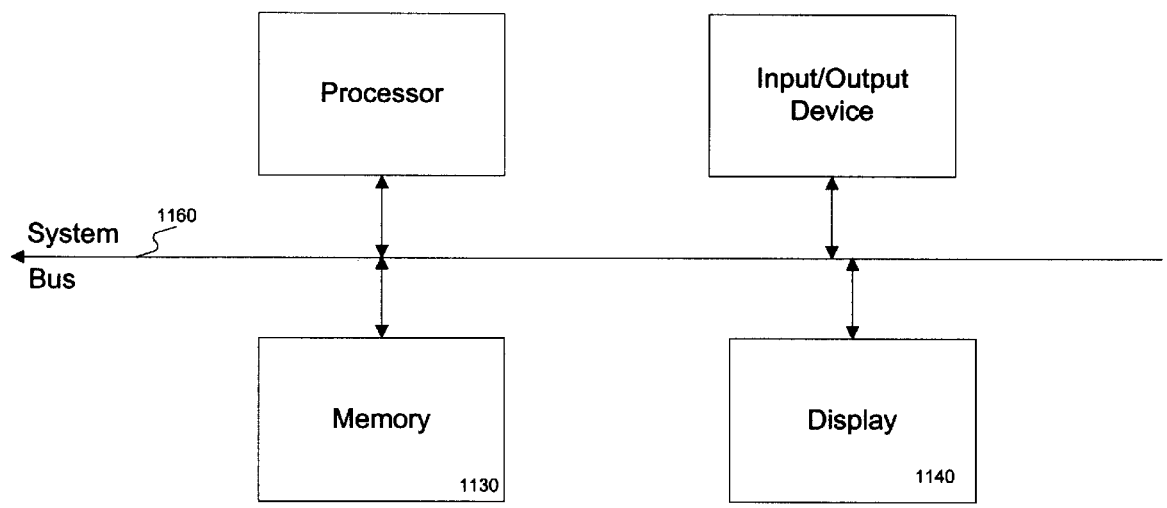
FIG. 11 is a diagram of a system consistent with the present invention.

FIG. 11 illustrates a system 1105 consistent with the present invention. As shown in FIG. 11, a processor 1110 is connected to at least one input/output (I/O) device 1120 via any suitable data connection. I/O device 1120 can be any device capable of passing information to or receiving data from processor 1110. By way of example only, I/O device 1120 may be a digital camcoder connected through an IEEE 1394 interface. Processor 1110 may be any commonly available digital processor such as, for example, a Pentium processor. Processor 1110 may be a single processor or multiple processors. Faster processors, however, will decrease execution time of the invention.

The system of the present invention also includes memory 1130 capable of storing data processed by processor 1110 and data sent to or received from I/O device 1120. System 1105 may be connected to a display 1140, such as a cathode ray tube (CRT), for displaying information. Processor 1110, I/O device 1120, memory 1130, and display 1140 are connected via a standard system bus 1160. FIG. 11 shows an exemplary network where each hardware component may be implemented by conventional, commercially available computer systems components.

Figure 12:
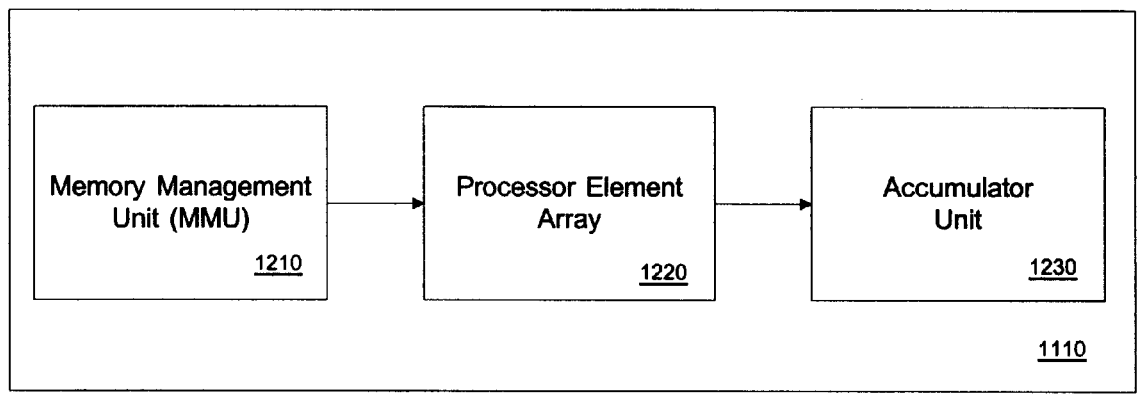
FIG. 12 is a diagram of a processor consistent with the present invention.

FIG. 12 illustrates a processor consistent with the present invention. Processor 1110 may comprise one or more memory management units (MMU) 1210, one or more processor element arrays 1220, and one or more accumulator units 1230. Processor element array 1220 may comprise an array of processor elements 1225. Processor elements 1225 may comprise, for example, a subtraction and adder units for calculating the SAD between the blocks. MMU 1210 may be used to buffer the data for processor element array 1220. Accumulator unit 1230 may be, for example, an adder unit that adds the outputs from processor elements 1225.

Consistent with one implementation of the invention, processor 1110 executes one or more sequences of one or more instructions contained in memory 1130. Such instructions may be read into memory 1130 from a computer-readable medium via input/output device 1120. Execution of the sequences of instructions contained in memory 1130 causes processor 1110 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 1110 for execution. Such a medium may take many forms, including but not limited to, non-volatile media, volatile media, and transmission media. Non-volatile media includes, for example, optical or magnetic disks. Volatile media includes dynamic memory, such as memory 1130. Transmission media includes coaxial cables, copper wire, and fiber optics, including the wires that comprise system bus 1160. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read. Network signals carrying digital data, and possibly program code, to and from system 1105 through system bus 1160 are exemplary forms of carrier waves transporting the information. In accordance with the present invention, program code received by system 1105 may be executed by processor 1110 as it is received, and/or stored in memory 1130, or other non-volatile storage for later execution.

It will be apparent to those skilled in the art that various modifications and variations can be made in the methods and systems consistent with the present invention without departing from the spirit or scope of the invention. The true scope of the invention is defined by the following claims.

What is claimed is:

1. A method for obtaining a motion vector between two frames of video image data, comprising the steps of:
   (a) selecting a two-dimensional current block of a first frame, the current block comprising an N×M array of pixel information, where N and M are positive integers greater than 1;

(b) determining a two-dimensional search area of a second frame based on the current block and a predetermined search range;

(c) determining a first set of candidate blocks by selecting at least one candidate block in each strip of pixel information based on the current block and a predetermined difference criterion, each candidate block comprising an N×M array of pixel information;

(d) determining a second set of candidate blocks by selecting at least one candidate block in each of at least one secondary search areas based on the current block and the predetermined difference criterion, each candidate block comprising an N×M array of pixel information and each of the at least one secondary search areas based on the first set of candidate blocks;

(e) obtaining a reference block from the second set of candidate blocks based on the predetermined difference criterion; and (f) determining a motion vector representing the distance between the current block and the reference block.

2. The method of claim 1, wherein the step of determining a first set of candidate blocks comprises the steps of:

determining at least one candidate block for each strip, a candidate block comprising the N×M array of pixel information beginning with the pixel elements forming one edge of the strip;

calculating a difference between the current block and the at least one candidate block; and determining a candidate block for each strip that has minimum difference from the current block.

3. The method of claim 1, wherein the step of determining a second set of candidate blocks comprises the steps of:

determining at least one secondary search area, each secondary search area based on one of the first set of candidate blocks and a predetermined offset value;

selecting at least one reference block within the at least one secondary search area, a reference block comprising an N×M array of pixel information;

determining a difference between the current block and the at least one reference block; and determining a candidate block for each of the at least one secondary search areas that has minimum difference from the current block.

4. The method of claim 3, wherein the predetermined offset value is based on the predetermined search range.

5. The method of claim 1, wherein the step of obtaining a reference block comprises the step of determining the representative block in the second set of candidate blocks that has the minimum difference from the current block.

6. The method of claim 1, further comprising the step of:

(g) obtaining an integral projection array representing the current block.

7. The method of claim 6, wherein the step of determining a first set of candidate blocks comprises the steps of:

determining at least one reference block for each strip, a reference block formed by the N×M array of pixel information beginning with the pixel elements forming one edge of the strip;

obtaining at least one integral projection array, each array representing one of the at least one reference blocks;

determining a difference between the current block and the at least one reference block in the strip based on the integral projection array representing the current block and the at least one integral projection array representing the reference block; and determining a candidate block for each strip that has minimum difference from the current block.

8. The method of claim 6, where in the step of determining a second set of candidate blocks comprises the steps of:

determining at least one secondary search area, each secondary search area based on one of the first set of candidate blocks and a predetermined offset value;

determining at least one reference block within the at least one secondary search areas, a reference block comprising an N×M array of pixel information;

obtaining at least one integral projection array, each array representing one of the at least one reference blocks;

determining a difference between the current block and the at least one reference block based on the integral projection array representing the current block and the at least one integral projection array representing the at least one reference block; and determining a candidate block for each of the at least one secondary search areas that has minimum difference from the current block.

9. The method of claim 8, wherein the predetermined offset value is based on the predetermined search range.

10. The method of claim 6, wherein the step of obtaining a representative block comprises the step of determining the at least one representative block in the second set of candidate blocks that has the minimum difference from the current block.

11. The method of claim 7, wherein the step of obtaining an integral projection array representing a reference block comprises the steps of:

(a) obtaining a first integral projection array representing a first block located a first distance away from the reference block;

(b) obtaining a second integral projection array representing a second block located to a second distance away from the reference block; and (c) obtaining an integral projection array representing the reference block based on the first and second integral projection arrays and the first and second distances.

12. The method of claim 8, wherein the step of obtaining at least one integral projection array representing the at least one reference block comprises the steps of:

(a) obtaining a first integral projection array representing a first block located a first distance away from the reference block;

(b) obtaining a second integral projection array representing a second block located to a second distance away from the reference block;

(c) obtaining a third integral projection array representing a third block located a third distance away from the reference block;

(d) obtaining a fourth integral projection array representing a fourth block located to a fourth distance away from the reference block; and (e) obtaining an integral projection array representing the reference block based on the first, second, third, and fourth integral projection arrays and the first, second, third, and fourth distances.

13. A motion estimation system for obtaining a motion vector between two frames of video image data comprising:

(a) means for selecting a two-dimensional current block of a first frame, the current block comprising an N×M array of pixel information, where N and M are positive integers greater than 1;

(b) means for determining a two-dimensional search area of a second frame based on the current block and a predetermined search range;

(c) means for determining a first set of candidate blocks by selecting at least one candidate block in each strip of pixel information based on the current block and a predetermined difference criterion, each candidate block comprising an N×M array of pixel information;

(d) means for determining a second set of candidate blocks by selecting a candidate block in each of at least one secondary search areas based on the current block and the predetermined difference criterion, each candidate block comprising an N×M array of pixel information and the at least one secondary search areas based on the first set of candidate blocks;

(e) means for obtaining a reference block from the second set of candidate blocks based on the predetermined difference criterion; and (f) means for determining a motion vector representing the distance between the current block and the reference block.

14. The system of claim 13, wherein the means for determining a first set of candidate blocks further comprises:

means for determining at least one candidate block for each strip, a candidate block comprising the N×M array of pixel information beginning with the pixel elements forming one edge of the strip;

means for determining a difference between the current block and the at least one reference blocks in the strip; and means for determining a candidate block for each strip that has minimum difference from the current block.

15. The system of claim 13, wherein the means for determining a second set of candidate blocks further comprises:

means for determining at least one secondary search area, based on one of the first set of candidate blocks and a predetermined offset value;

means for selecting at least one reference blocks within the at least one secondary search area, a reference block comprising an N×M array of pixel information;

means for determining a difference between the current block and the at least one reference block; and means for determining a candidate block for each of the at least one secondary search area that has minimum difference from the current block.

16. The system of claim 15, wherein the predetermined offset value is based on the predetermined search range.

17. The system of claim 16, wherein the means for obtaining a reference block further comprises a means for determining a reference block in the second set of candidate blocks that has the minimum difference from the current block.

18. The system of claim 13, further comprising:

(g) means for obtaining an integral projection array representing the current block.

19. The system of claim 18, wherein the means for determining a first set of candidate blocks further comprises:

means for determining at least one reference block for each strip, a reference block formed by the N×M array of pixel information beginning with the pixel elements forming the upper row of the strip;

means for obtaining at least one integral projection array representing the at least one reference block;

means for determining a difference between the current block and the at least one reference block in the strip based on the integral projection array representing the current block and the at least one integral projection array representing the reference block; and means for determining a candidate block for each strip that has minimum difference from the current block.

20. The system of claim 18, wherein the means for determining a second set of candidate blocks further comprises:

means for determining at least one secondary search area, each secondary search area based on one of the first set of candidate blocks and a predetermined offset value;

means for determining at least one reference block within the at least one secondary search area, a reference block comprising an N×M array of pixel information;

means for obtaining at least one integral projection array representing the at least one reference block;

means for determining a difference between the current block and the at least one reference block based on the integral projection array representing the current block and the at least one integral projection array representing the reference block; and means for determining a candidate block for each of the at least one secondary search area that has minimum difference from the current block.

21. The system of claim 20, wherein the predetermined offset value is based on the predetermined search range.

22. The system of claim 18, wherein the means for obtaining a reference block comprises means for determining a reference block in the second set of candidate blocks that has the minimum difference from the current block.

23. The system of claim 19, wherein the means for determining a first set of candidate blocks further comprises:

means for obtaining a first integral projection array representing a first block located a first distance away from the reference block;

means for obtaining a second integral projection array representing a second block located to a second distance away from the reference block; and means for obtaining an integral projection array representing the reference block based on the first and second integral projection arrays and the first and second distances.

24. The system of claim 19, wherein the means for determining a second set of candidate blocks further comprises:

means for obtaining a first integral projection array representing a first block located a first distance away from the reference block;

means for obtaining a second integral projection array representing a second block located to a second distance away from the reference block;

means for obtaining a third integral projection array representing a third block located a third distance away from the reference block;

means for obtaining a fourth integral projection array representing a fourth block located to a fourth distance away from the reference block; and means for obtaining an integral projection array representing the reference block based on the first, second, third, and fourth integral projection arrays and the first, second, third, and fourth distances.

25. A computer program product comprising:

a computer-usable medium having computer-readable code embodied therein for obtaining a motion vector between two frames of video image data, the computer-usable medium comprising:

a component configured to select a two-dimensional current block of a first frame, the current block comprising an N×M array of pixel information, where N and M are positive integers greater than 1;

a component configured to determine a two-dimensional search area of a second frame based on the current block and a predetermined search range;

a component configured to determine a first set of candidate blocks by selecting at least one candidate block in each strip of pixel information based on the current block and a predetermined difference criterion, each candidate block comprising an N×M array of pixel information;

a component configured to determine a second set of candidate blocks by selecting at least one candidate block in each of at least one secondary search areas based on the current block and the predetermined difference criterion, each candidate block comprising an N×M array of pixel information and each of the at least one secondary search areas based on the first set of candidate blocks;

a component configured to obtain a reference block from the second set of candidate blocks based on the predetermined difference criterion; and a component configured to determine a motion vector representing the distance between the current block and the reference block.

* * * * *

UNITED STATES PATENT AND TRADEMARK OFFICE
CERTIFICATE OF CORRECTION

PATENT NO. : 6,128,047  
APPLICATION NO. : 09/081279  
DATED : October 3, 2000  
INVENTOR(S) : Chang et al.

Page 1 of 1

It is certified that error appears in the above-identified patent and that said Letters Patent is hereby corrected as shown below:

Claim 15, col. 15, line 49, "representative," should read --reference--.

Claim 10, col. 16, lines 24 and 25, "representative," should read --reference--.

Claim 15, col. 17, lines 36, "blocks," should read --block--.

Signed and Sealed this

Thirtieth Day of January, 2007

JON W. DUDAS  
*Director of the United States Patent and Trademark Office*